United States Patent [19]

Hartmann

[11] 3,859,466

[45] Jan. 7, 1975

[54] RECIPROCAL SYNCHRONIZATION OF OSCILLATORS OF A TIME MULTIPLEX TELEPHONE COMMUNICATION NETWORK

[75] Inventor: Lothar Hartmann, Braunschweig, Germany

[73] Assignee: Siemens Aktiengesellschaft, Munich, Germany

[22] Filed: Apr. 19, 1973

[21] Appl. No.: 352,458

Related U.S. Application Data

[63] Continuation-in-part of Ser. No. 256,199, May 23, 1972, abandoned, which is a continuation of Ser. No. 779,420, Nov. 27, 1968, abandoned.

[52] U.S. Cl. .............................................. 179/15 BS
[51] Int. Cl. .............................................. H04j 3/06
[58] Field of Search.......... 179/15 BS; 178/69.5 R

[56] References Cited

UNITED STATES PATENTS

| | | | |
|---|---|---|---|
| 2,986,723 | 5/1961 | Darwin | 179/15 BS |
| 3,050,586 | 8/1962 | Runyon | 179/15 BS |
| 3,424,864 | 1/1969 | Williams | 179/15 BS UX |
| 3,453,594 | 7/1969 | Jarvis | 179/15 BS |

OTHER PUBLICATIONS

Bell System Technical Journal, Dec. 1965, pp. 1689–1704, "Mutual Synchronization of Geographically Separated Oscillators" by Gersho et al.

*Primary Examiner*—David L. Stewart

[57] ABSTRACT

A method and arrangement for reciprocally synchronizing oscillators provided in each of a plurality of exchange stations of a time multiplex long distance telecommunication network is described. Each oscillator emits synchronizing pulses in time slots usable for signal transmission by the corresponding exchange station. A discriminator is provided at each exchange station to which are applied synchronizing pulses of the oscillator pertaining thereto and synchronizing pulses of oscillators provided in other exchange stations connected therewith. The discriminator applies to the oscillator pertaining thereto a control potential to cause in a given case a change in its oscillating frequency. Synchronizing pulses emitted by the oscillator in each exchange station and the synchronizing pulses transmitted by the oscillators of other exchange stations are applied to frequency dividers connected to the discriminator. Application of output signals to the discriminator occurs after receipt of a specified number of synchronizing pulses by its frequency divider selectively begins or terminates. Output signals from other exchange stations to the discriminator of its exchange station are emitted with termination of the emission of output signals from another frequency divider connected to the oscillator provided in the exchange station in question.

9 Claims, 4 Drawing Figures

RECIPROCAL SYNCHRONIZATION OF OSCILLATORS OF A TIME MULTIPLEX TELEPHONE COMMUNICATION NETWORK

CROSS REFERENCE TO RELATED APPLICATION

This application is a continuation in part of application Ser. No. 256,199, filed May 23, 1972, now abandoned, which is a continuation of application Ser. No. 779,420, filed Nov. 27, 1968, now abandoned.

BACKGROUND OF THE INVENTION

1. Field of the Invention

The invention relates to the field of long distance communications and particularly to telephone exchange installations operating according to time multiplex techniques. The invention provides for the reciprocal synchronization of oscillators located at different exchange stations.

2. Description of the Prior Art:

In the course of development of telecommunication exchange installations exchange installations operating according to the time multiplex principles have been increasingly employed. Using the time multiplex technique message signals are transmitted by a plurality of subscriber stations over a single line in time spaced manner. Thus, for each of the message signals, a time channel is available with a series of time slots occurring in cyclic repetition. For the time duration of the time slots synchronizing pulses are produced, in a given case modulated by message signals, by an oscillator provided in the exchange installation.

Because of the physical properties of the switching elements used, exchange installations and the limited traffic load of exchange installations, it is necessary, in order to accommodate the event when a plurality of message connections are necessary simultaneously, to combine a certain number of subscriber stations or message transmitters in exchange stations. Ordinarily an individual oscillator is used in each exchange station, and this oscillator emits synchronizing pulses in the time slots allocated to a particular signal transmission. However, the use of separate oscillators in the individual exchange stations causes some problems. These problems result from the fact that the oscillating frequencies of the individual oscillators normally change or drift in the course of time in different manner, whereby an appropriate assignment of the synchronizing pulses emitted by the oscillator in the exchange station, to the time slots usable for signal transmission in the exchange station in question, is not guaranteed. This means that two subscriber stations connected to different exchange stations cannot carry for an extended time a message exchange in the time slots assigned thereto.

In order to insure that a first subscriber station connected to an exchange station remains connected during the transmission or reception of message signals to or from a second subscriber station connected to another exchange station, it must be insured that the repetition period of the synchronizing pulses occurring in the individual time slots of a time channel remains the same for the first subscriber station during the exchange of messages. This means that in the entire long distance communication network, a certain network frequency is desired, which is the same in each exchange station. The network frequency is that frequency with which the mentioned synchronizing pulses appear in the exchange station in question.

In order to satisfy the previously stated requirements the prior art teaches that the oscillators in all exchange stations of a long distance communication network are to be synchronized from a main oscillator at a central location. With such a solution, disturbances which may occur can expand with relatively great effect in the entire long distance communication network. It has been attempted to synchronize the oscillators provided in the individual exchange stations of an exchange system operating according to the time multiplex principle in another way to avoid the foregoing disadvantage.

A solution suitable therefor is, for example, shown in the "Abstracts of the Journal of the Institute of Electrical Communication Engineers of Japan," Vol. 49, No. 4 April 1966, pp. 19–21 which is published in the English language. According to this solution, the synchronizing pulses of the oscillator in a given exchange station and the synchronizing pulses from other exchange stations are applied to a sawtooth phase comparator circuit for the reciprocal synchronization of oscillators pertaining to exchange stations of a time multiplex long distance communication network. This sawtooth phase comparator circuit ascertains in each case the phase deviation between the synchronizing pulses emitted by the oscillator provided in the exchange station in question and the synchronizing pulses which have been applied to the phase comparator circuit in question from other exchange stations. The output signal of this sawtooth phase comparator circuit is used for the controlling of the oscillator provided in the exchange station in question. This oscillator is a finely-tunable oscillator, the frequency of which is changeable through application of a corresponding control potential.

In a time multiplex long distance communication network in which the oscillators pertaining to the individual exchange stations forming this long distance communication network synchronize each other reciprocally, in the previously described manner, a certain network frequency sets in after a certain period of time. The synchronization of the oscillators provided in the individual exchange stations of the time multiplex long distance communication network in question poses, however, considerable difficulty, at first, when the long distance communication network in question is started, or when a new exchange station is connected to the already started long distance communication network. These difficulties are due to the fact that by reason of different delay times on the lines connected between the oscillators to be synchronized reciprocally, over which the synchronizing pulses serving for the synchronization of the oscillators in question are to be transmitted, an oscillator N synchronizing any oscillator M can be considerably detuned by the synchronizing pulses again conveyed to it from oscillator M. The cause therefor resides in the fact that the discriminator emitting the tuning voltage for the oscillator determines the phase deviations between the pulses given off by the oscillator in question and the pulses conveyed from the other oscillator. It should be realized that the difficulties shown above in connection with two oscillators are present, to a considerably larger extent, when oscillators between which a reciprocal synchronization is to be carried out are connected in large numbers.

SUMMARY OF THE INVENTION

These and other defects of the prior art are solved by this invention which shows a means and method by which oscillators located in individual exchange stations of a time multiplex long distance communication system can be synchronized reciprocally in an especially simple manner. Accordingly, the invention concerns a method for the reciprocal synchronization of tunable oscillators that emit synchronizing pulses, which may be modulated with message signals, in time slots usable for signal transmission in the exchange station in question. In particular a pulse code modulated (PCM) time multiplex long distance communication network is employed.

A discriminator is provided at each exchange to which the synchronizing pulses of the oscillator in the exchange station and the synchronizing pulses of oscillators in other exchange stations connected to the exchange station in question are applied. The discriminator applies to the oscillator in the exchange station in question, a control potential which, in a given case, leads to a change in the oscillating frequency of this oscillator.

According to the invention, synchronizing pulses emitted by the oscillator provided in the exchange station in question, as well as synchronizing pulses received from other exchange stations, are applied to an individual frequency divider of a group of frequency dividers connected to the discriminator. The frequency dividers, in each case after reception of a specified and equal number of synchronizing pulses, start or terminate the emission of an output signal to the discriminator. The emission of output signals from the frequency dividers receiving synchronizing pulses transmitted by other exchange stations, in the exchange station in question, to the discriminator contained in the exchange station in question, is enabled with termination of the emission of a corresponding output signal from the frequency divider connected to the output of the oscillator provided in the exchange station in question.

This provides the advantage that it is possible, in relatively simple manner, i.e., by delaying start of the emission of output signals from those frequency dividers that receive synchronizing pulses from exchange stations connected to the exchange station in question, up to a point in time at which an output signal is emitted from the frequency divider connected to the output of the oscillator provided in the exchange station in question, to apply a control voltage to the oscillator, provided at each exchange station. Further the control voltage is applied at the time of starting the exchange station containing the oscillator in question and also upon the connection of an added exchange station. The oscillator in question thus oscillates at a frequency lying in the immediate vicinity of its mid-frequency which corresponds to the mentioned desired synchronizing frequency of the entire long distance communication network. Thereby the above-mentioned difficulties of the prior art are overcome, which otherwise could occur at the adding of an exchange station of the kind here discussed to already operating exchange stations of a long distance communication network.

According to a suitable development of the method according to the invention, the frequency reducing factor of the frequency divider is selected to equal the product of the network frequency desired in the entire long distance communication network and the maximum delay time fluctuations maximally associated with the individual connection lines between the exchange stations. It is at least equal to approximately $\lambda/2\ f$ wherein $\lambda$ represents the frequency bandwidth of the oscillator at the exchange station in question and $\Delta$ f represents the permissible frequency deviation from the desired network frequency after connection of the individual exchange stations. If the frequency reducing factor of the frequency dividers is selected in this way, it is advantageously guaranteed that the oscillator pertaining to the exchange station oscillates for a very short time, after the enabling of the frequency dividers receiving synchronizing pulses from other exchange stations, with a frequency lying in the immediate vicinity of its mid-frequency. This provides the further advantage that a change in the oscillating frequency of the oscillator provided in the exchange station in question, upon the occurrence of delay time fluctuations on the connection lines between the individual exchange stations carrying the synchronizing pulses, is decreased to fractions of the interception range in each case.

To carry out the method according to the invention it is suitable to provide in each exchange an oscillator emitting synchronizing pulses in time slots usable for signal transmission by its exchange station. The oscillator is connected at its output to a frequency divider which is connected to the input of a discriminator having a plurality of inputs and one output, the remaining inputs of which are connected through frequency dividers, to connected oscillators which emit corresponding synchronizing pulses and are contained in exchange stations adjacent to the exchange station in question. The output of the discriminator is connected to a control input of the oscillator provided in the exchange station in question, which is tunable in its oscillating frequency by control signals applied to the control input. Thereby a control circuit is assigned to the frequency dividers provided in each exchange station, which can receive the output signals of that frequency divider connected to the output of the oscillator of the corresponding exchange station, and the synchronizing pulses applied to its frequency divider from another exchange station. The control circuit can emit signals to its frequency divider, serving in each case for the reception of the mentioned synchronizing signals or for resetting the frequency divider to its original position. This provides the advantage that it is possible, at relatively low cost for circuits and components to carry out a reciprocal synchronization of oscillators provided at different individual exchange stations of a time multiplex long distance communication system.

According to a further development of the invention, the discriminator comprises a sawtooth phase comparator circuit which emits output signals corresponding to the phase difference between the leading or trailing edges of the control signals applied to it. Through this, it is possible to receive from the discriminator a tuning signal or a control potential for the oscillator provided in the exchange station in question, which changes proportionally in amplitude and/or time duration with the phase difference between the leading or trailing edges of related control signals.

The sawtooth phase comparator circuit suitably contains for each of the exchange stations emitting synchronizing pulses to the exchange station in question, a sawtooth phase comparator stage comprising a bistable flip-flop stage. The outputs of all sawtooth phase comparator stages provided in the exchange station in question are combined, in an adding circuit carrying out the arithmetical means formation of the signals applied thereto. A low-pass filter is connected to the output of the adder, from the output of which a control potential serving for the frequency tuning of the oscillator provided in the exchange station can be produced.

An amplifier may be connected to the output of each of the sawtooth phase comparator stages if required. This provides the advantage that, with relatively simply developed pulse amplifiers, a control potential can be produced at the output of the phase comparator circuit with sufficient amplitude, without the need to connect a separate, relatively expensive and complicated amplifier after the phase comparator circuit.

DETAILED DESCRIPTION OF THE INVENTION

Figure 1:
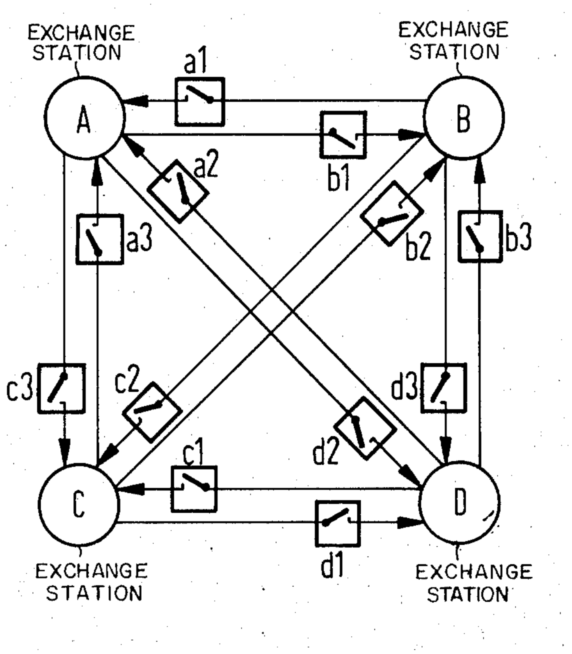
FIG. 1 schematically shows a known long distance communication network consisting of four connected exchange stations.

FIG. 1 shows a long distance communication network comprising four exchange stations: exchange stations A, B, C and D. In each case two connection lines are connectable between individual exchange stations. Each connection line serves to transmit message signals from one exchange station to another in one direction, as indicated by the directions shown in FIG. 1.

Switches are interposed in the connection lines connecting the individual exchange stations of the long distance communication network. Thus, switches a1, a2, and a3 are interposed in the connection lines between exchange stations B, C, D and exchange station A. Switches b1, b2 and b3 are interposed in the connection lines between exchange stations A, C and D and exchange station B. Switches c1, c2, and c3 are interposed in the connection lines between exchange stations A, B, D and exchange station C. Similarly switches d1, d2 and d3 are interposed in the connection lines between exchange stations A, B, D and exchange station D. These switches are actuated from the exchange station pertaining thereto in each case. Thus switches a1, a2, a3 are actuated from exchange station A, for example.

In order to set into operation the long distance communication network shown in FIG. 1 and to thereby carry out the reciprocal synchronization of oscillators provided in the individual exchange stations, synchronizing pulses are transmitted in time slots allocated for signal transmission between selected exchange stations. At first, for example, switches a1, a2, a3 which are actuable by exchange station A, are actuated to their closed positions. Thereby, the synchronizing pulses generated at exchange stations B, C, D are transmitted to exchange station A. The oscillator provided at exchange station A is synchronized upon receipt of synchronizing pulses from the oscillators provided at exchange stations B, C and D. Subsequently, the corresponding switches operable by exchange stations B, C and D, then can be actuated to their closed positions in succession. As will be evident from the following discussion, the frequency of the oscillators provided at the individual exchange stations is not shifted to an appreciable extent when these switches are actuated. With regard to the long distance communication network shown in FIG. 1 it shall further be mentioned that, deviating from the shown and the previously explained conditions, the switches can be actuated in each case by the exchange station that transmits synchronizing pulses to the remaining exchange stations. Thus, in the case of the long distance communication network shown in FIG. 1, switches b1, c3, d2 could be actuated by exchange station A, for example.

In the foregoing, the construction of the telecommunication system shown in FIG. 1 has been discussed to the extent required herein. A detailed description of a preferred construction of a synchronizing circuit for the oscillator in one of the changes in the telecommunication system will be given with particular reference to the preferred embodiment shown in FIG. 2.

Figure 2:
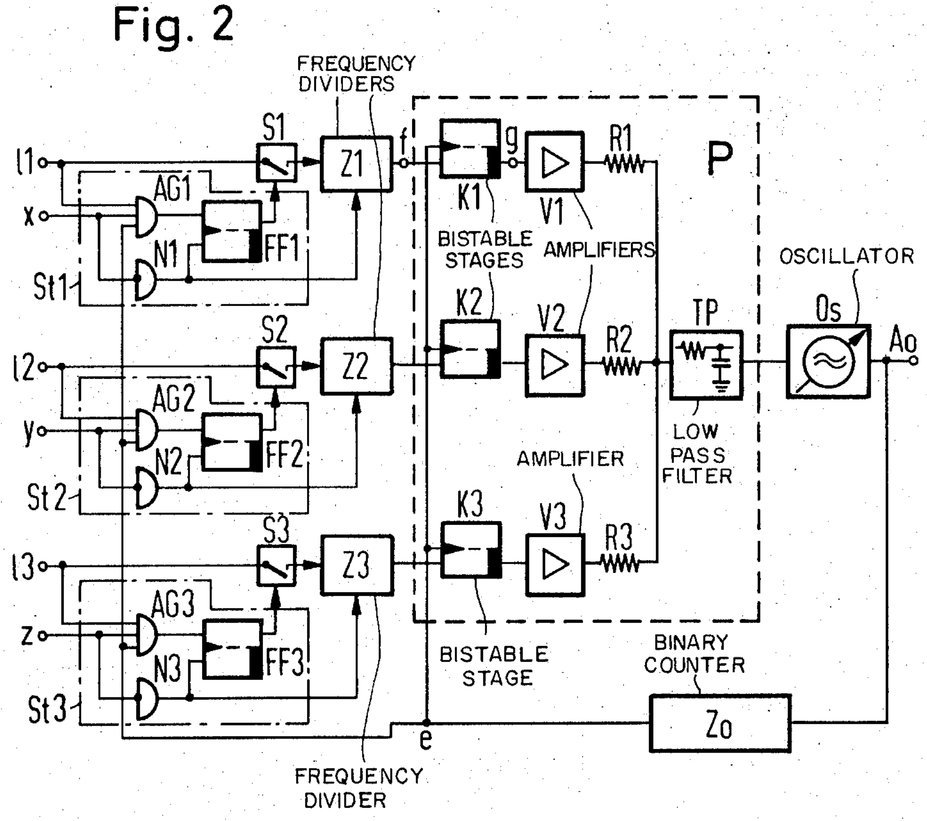
FIG. 2 is a block-schematic diagram of a preferred embodiment of a synchronizing circuit, one of which is to be used in each of the exchange stations in the FIG. 1 network.

The circuit arrangement illustrated in FIG. 2 has three incoming lines 11, 12, 13, over which are delivered timing pulses from oscillators provided in other correspondingly constructed exchanges. These are pulses having a frequency corresponding to the system frequency. The timing pulses conveyed over the incoming circuits 11, 12 and 13 are coupled over the switches S1, S2 or S3, when closed, connected to the inputs of frequency-divider stages Z1, Z2 and Z3.

In this embodiment it will be assumed that these switches correspond to the switches shown in FIG. 1, which are actuated from the exchange concerned. Thus, the switches S1, S2 and S3 of FIG. 2 may, for example, correspond to the switches a1, a2 or a3, which are actuated from the exchange A.

As is well known, these switches may be electronic switches which are closed by the application of a pulse signal or the like to a control input thereof.

As indicated hereinabove, each of the frequency-divider stages Z1, Z2 and Z3, preferably, has a frequency reduction factor which is equal to the product of the desired system frequency and the maximum delay time fluctuations that occur on the lines interconnecting the individual exchanges, and over which the timing pulses are transmitted from the respective exchanges. The frequency reduction factor is selected to be at least approximately equal to $\lambda/2\Delta f$, where $\lambda$ represents the frequency bandwidth of the oscillator contained in the exchange concerned and $\Delta$ f represents the allowable frequency deviation from the desired system frequency after the individual exchanges have been connected. In the present case, the frequency divider stages are formed by binary counters. The number of individual binary counter stages depends on the aforementioned frequency reduction factor. For example, if the desired frequency-divider factor is eight, this means that a four-stage binary counter shall be employed as a frequency-divider stage. At the output of the last binary counter stage of such a binary counter there occurs in this example a change of state after the appearance of eight timing pulses. The processes in connection therewith will be discussed in detail hereinbelow.

The outputs of the counters or the frequency-divider stages Z1, Z2 and Z3, mentioned hereinabove, are connected to the inputs of a discriminator P. In this example, this discriminator P is formed by a sawtooth phase comparison circuit containing three sawtooth phase comparison stages formed in each case by a bistable switching stage K1, K2 or K3. An amplifier V1, V2 or V3 is connected respectively, to the output of each of the phase comparison stages. As mentioned hereinabove, these amplifiers may be formed by simple pulse amplifiers.

A summing network which produces an output signal corresponding to the arithmetic mean value of the signals transmitted thereto is connected to the outputs of amplifiers V1, V2 and V3. This network is formed by the resistors R1, R2 and R3 as shown in FIG. 2.

The input of a low-pass filter TP is connected to the output of this summing network, and the output of this low-pass filter TP represents the output of discriminator P. The input of an oscillator Os, conventionally constructed to have a voltage-controllable frequency is connected to this output of discriminator P. With respect to the low-pass filter TP in discriminator P, it will be noted that a simple RC network is used, and it has a time constant selected such that in the presence of a specified frequency reduction factor m of the frequency divider stages provided in the exchange concerned and a given bandwidth $\lambda$ for the oscillator provided for in the exchange concerned for the product $\mu \lambda/m$ T, resulting from amplification factor and time constant of the feedback control system, the relationship $0 \leq \mu \leq 0.5$ exists. Thus, a stable operation of the network is assured.

The oscillator Os shown in FIG. 2, which has its input connected to the output of the aforesaid discriminator P, is an electronic oscillator of known construction having a controllable frequency; it transmits timing pulses from its output Ao forming time slots which can be utilized for signal transmission. These timing pulses are further delivered to a frequency divider stage Zo connected to the output of oscillator Os. This frequency divider stage Zo, like the aforementioned frequency divider stages Z1, Z2, Z3, is formed by a binary counter, which, in the present case, contains four binary counter stages. Thus, the output signal, just as in each of the counters Z1, Z2 and Z3, changes in the binary counter Zo after reception of eight timing pulses.

The output of the binary counter Zo is connected to a terminal e at the clock input of the bistable switching stages K1, K2, K3 in the discriminator P. Moreover, the output of counter Zo is connected to a control input of control circuits St1, St2, St3 which are individually assigned to counters Z1, Z2 and Z3. The functions of these control circuits St1, St2 and St3 will become more readily apparent when considered together with the explanation of the pulses diagrams of FIGS. 3 and 4, and their construction is described in detail hereinbelow.

Aside from the triggering caused by the output of counter Zo, the control circuits St1, St2 or St3 can also be triggered by the timing pulses to be delivered to the counter Z1, Z2 or Z3 over, respectively, the lines 11, 12 and 13. Thus, the timing pulses occurring on circuit 11 and to be delivered to counter Z1 are supplied to the control circuit St1 corresponding to counter Z1. Each of the control circuits St1, St2, St3 has in addition a separate control input *x*, *y* or *z*.

As is readily apparent from FIG. 2, the control circuits St1, St2, St3 are similarly constructed. It suffices, therefore, to describe the details of the construction of one of these control circuits, i.e., control circuit St1. In control circuit St1 an AND gate AG1 having three inputs and one output is connected with one input being connected to line 11, a second input connected to a control input *x*, and a third input of AND gate AG1 is connected to the output of counter Zo. The output of AND gate AG1 is connected to the set input of a bistable switching stage FF1, which 1 has an output connected to the actuating input of switch S1. In the output of the bistable switching stage a potential corresponding to a logic 1, is produced after a control signal corresponding to a logic 1 has been delivered to the set input of the bistable stage. Aside from the elements described, the control circuit St1 includes an inverter N1 having an input connected to the control input *x* and an output connected to a reset input of counter Z1. If a signal corresponding to, in this example, a 1 is transmitted to this reset input, then the counter in question is reset to its output position. The output of inverter N1 is further connected to the reset input of the bistable switching stage FF1.

With regard to the remaining control circuits St2 and St3 illustrated in FIG. 2, it is to be noted that AND gates are provided corresponding to the AND gate AG1, described hereinabove, viz. AND gate AG2 or AG3. These AND gates AG2, AG3 are correspondingly connected to lines 12 and 13, control inputs *y* and *z*, and the output of counter Zo. Furthermore, control circuits St2, St3 of the bistable switching stage FF1, described hereinabove, have corresponding bistable switching stage FF2, FF3, which are triggered in the same manner as the bistable switching stage FF1 in the control circuit St1, and which are similarly connected on the output end with the actuating input of switch S2 or S3. Furthermore, control circuits St1 and St3 have inverters N2 and N3 which correspond to the inverter N1 described in connection with control circuit St1.

In order to effectively connect the counter Z1, Z2 or Z3 corresponding to the respective control circuit St1, St2 or St3, it is necessary that a control signal be delivered to the control input *x*, *y* or *z* corresponding to the respective control circuit St1, St2 or St3. This control signal can be generated either in the exchange, of which the illustrated control circuit is a part, or it can be transmitted from any remote input location to this exchange, or to the corresponding control input of the exchange in question. In this example it is assumed that control signals which are generated in the exchange concerned are delivered to the control inputs *x*, *y* or *z*. In this connection, it is to be noted that normally, i.e., when the circuit is not in operation, signals corresponding to a logic level 0 are transmitted. This means that, in this case, the AND gate AG1, AG2 or AG3 connected to the respective control input x, y or z, transmits at its output an output signal corresponding to a 0. A 0 signal appearing at the control input *x*, *y* or *z*, causes the delivery of a signal corresponding to a 0 to the actuating input of the respective switch S1, S2 or S3 from the output of the respective bistable switching stage FF1, FF2 or FF3 over inverter N1, N2 or N3. The effect of this signal is that the respective switch S1, S2 or S3 is opened or remains open. Furthermore, a 1 signal which leads to the resetting is delivered to the reset input of the counter concerned.

In order to render the control circuits St1, St2 and St3 operative, it is not only necessary to transmit control signals to the control inputs $x$, $y$ or $z$ of these control circuits, but a signal must also be transmitted from the output of counter Zo. Moreover, at least one timing pulse must appear on the corresponding line 11, 12 or 13. With regard to the output signal from counter Zo, it may be assumed that the oscillator Os of the exchange being considered is in operation and that, therefore, corresponding signals are transmitted from the output of counter Zo. If it is assumed that a 1 signal is transmitted from the output of counter Zo and that, for example, a 1 control signal is coupled to the control input x, then the appearance of a timing pulse corresponding to a 1 on circuit 11 has as a consequence that the coincidence requirement of the AND gate AG1 is satisfied, and that a 1 is delivered from the output of this AND gate. The 1 control signal occurring at the control input x causes, as well, the 1 signal previously delivered to the reset input of counter Z1 to now disappear, and, instead, a 0 signal appears at this reset input. This 0 signal, however, has no further effect on counter Z1. However, the 1 signal appearing at the output of AND gate AG1 causes the setting of bistable switching stage FF1 and the transmission of a 1 signal from its output which is connected with the actuating input of switch S1, in response to which the switch S1 concerned is closed. Thus, the timing pulses occurring on circuit 11 reach the input of counter Z1 over the switch S1 which is now closed. A 0 signal, which has no effect, is transmitted by inverter N1 to the reset input of bistable switching stage FF1. The bistable switching stage being considered, and the transmission of a 1 signal from its output which is connected with the actuating input of switch S1, in response to which the switch S1 concerned is closed. Thus, the timing pulses occurring on circuit 11 reach the input of counter Z1 over the switch S1 which is now closed. A 0 signal, which has no effect, is transmitted by inverter N1 to the reset input of bistable switching stage FF1. The bistable switching stage being considered, and the switch controlled thereby, remain in the state discussed above as long as a 1 control signal is delivered to the control input being considered, in the present case to the control input x. The timing pulses on circuit 11 or the signals transmitted from the output of counter Zo cause no resetting of the bistable switching stage FF1 and of the switch controlled thereby. A resetting of the bistable switching stage FF1 and of the switch S1 controlled thereby occurs only when a 0 signal appears at control input x.

In the foregoing, the operation and construction of the control circuit St1 has been discussed in detail. It is to be noted that the control circuits St2 and St3 are constructed and operate in corresponding fashion.

Figure 3:
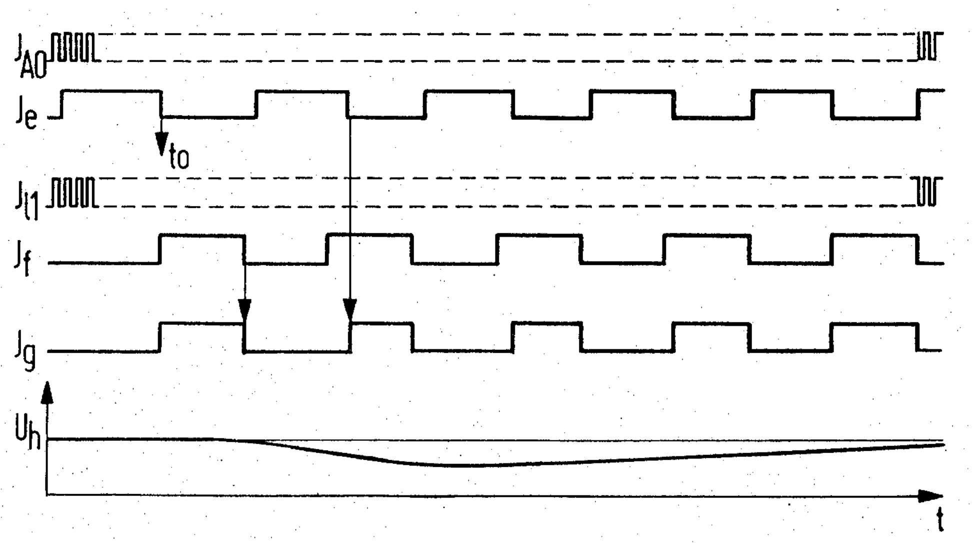
FIG. 3 illustrates, by pulse train graphs, the mode of operation of the circuit arrangement shown in FIG. 2 in a specific operational case.
Figure 4:
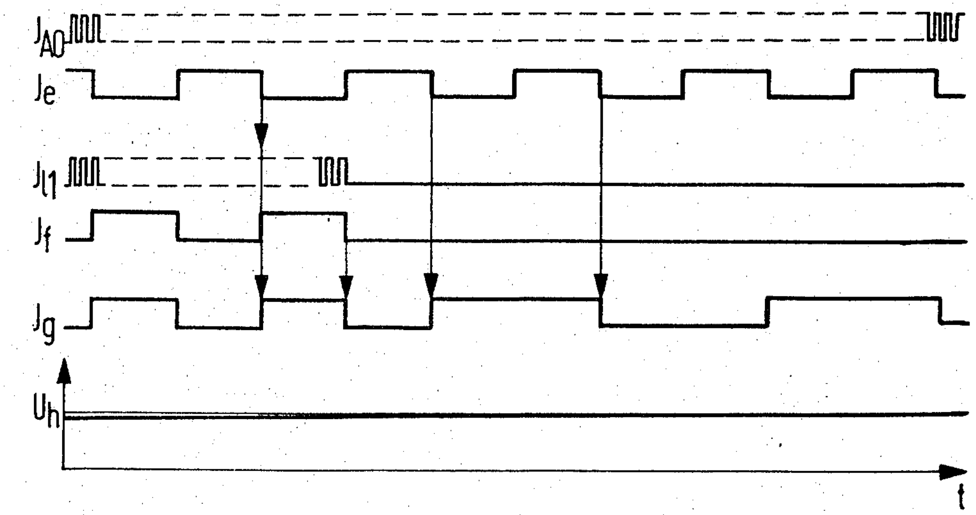
FIG. 4 illustrates, by a further pulse train graph, the mode of operation of the circuit arrangement shown in FIG. 2 in another operational case.

In FIGS. 3 and 4 there are shown pulse trains appearing at individual circuit points of the circuit arrangement shown in FIG. 2, and the waveform of the control potential at the output of discriminator P. Reference designations are assigned to the individual pulse trains of the pulse diagrams in question which are to illustrate that the pulse trains designated thereby appear at correspondingly designated circuit points in the circuit arrangement shown in FIG. 2. Thus, the pulse train designated $I_{Ao}$ appears at circuit point Ao at the output of oscillator Os. Correspondingly, the pulse train Ie appears at circuit point e which, according to FIG. 2, is the output of counter Zo; the pulse train $J_{11}$; on line 11; the pulse train Jf at output f of counter Z1; and the pulse train Ig at circuit point g at the output of the bistable flip-flop stage K1. The control potential designated Uh appears at the output h of discriminator P.

The pulse trains shown in FIG. 3 illustrate in detail the processes taking place during actuation of counter Z1 of the switching arrangement shown in FIG. 2. It can be assumed that synchronizing pulses at output Ao of oscillator Os are already transmitted to that exchange station the oscillator of which conveys its synchronizing pulses over line 11. As mentioned above, control circuit St1 emits an actuation signal which leads to the closing of switch S1 when a control pulse is applied to its control input x, synchronizing signals are applied to the input connected to line 11, and when a pulse is received from the output of counter Zo. It is noted that control circuit St1, and also each of the other control circuits provided, are able to carry out appropriate control processes at the non-appearance of the synchronizing pulses transmitted from another oscillator, as well as at non-appearance of the signals emitted by counter Zo. That is, the logic levels described herein, and certainly, other levels and combinations of levels can be used.

It shall be assumed that, as illustrated by pulse trains $I_e$ and $I_{11}$ at time $t_o$, the requirements are fulfilled for the control circuit St1 to emit an actuation signal to switch S1. The arrow drawn in at the trailing edge of the first pulse of the pulse train Ie, shown in FIG. 3, is to indicate that the aforementioned point in time $t_o$ coincides with the appearance of this trailing edge. In the present case counter Z1 is switched in such a way that, with the reception of the first synchronizing pulse applied to its input over the now closed switch S1, it emits an output signal for the duration of the receipt of eight further synchronizing pulses applied to the input of counter Z1. Subsequently, the previously explained process is again repeated. These conditions are reflected by pulse train If shown in FIG. 3.

Pulses If at the output f of counter Z1 and pulses Ze at output e of counter Zo are applied to flip-flop stage K1 of discriminator P. The inputs of flip-flop stage K1 and the inputs of the remaining flip-flop stages K2 and K3 in discriminator P are arranged in such a way that they only respond to the trailing edges of pulses applied thereto. At output g of bistable flip-flop stage K1 there appears an output pulse train Ig which corresponds to the phase difference between the trailing edges of the pulses applied to the input of flip-flop stage K1. Upon receipt of pulses Ig emitted from the output of flip-flop stage K1, discriminator P applies control potential Uh to oscillator Os.

A comparative consideration of pulse trains Je, Jf and Jg shows that after a final control time period, the pulses emitted by counter Zo. and the pulse pauses therebetween, are adapted in their duration to the duration of the pulses and pulse pauses of pulse train If. This is expressed in the pulse train Ig by the fact that the pulses and pulse pauses thereon have respectively, the same duration as the pulses and pulse pauses of pulse succession train Jf. Thereby oscillator Os in the circuit arrangement according to FIG. 2 is synchronized to the oscillating frequency of the oscillator, the synchronizing pulses of which have been applied over line 11. The control potential emitted from the output of low pass filter TP changes accordingly during the previously mentioned control time period. The waveform of control potential Uh is evident from the corresponding voltage diagram of FIG. 3. According thereto the discriminator applies, prior to actuation of counter Z1 and for a specified time period after actuation of this counter, a constant voltage to oscillator Os. The control voltage applied during actuation of counter Z1 to oscillator Os effects, as can be seen, that the oscillating frequency of Oscillator Os subsequently regulated to a desired value within a relatively short period of time.

The above described frequency reduction of the incoming synchronizing signals prior to comparison is particularly advantageous in that the frequency range over which the oscillator can fluctuate can, thereby, be significantly reduced. It will be remembered from the discussion above that the actuation of counters Z1, Z2 and Z3 by their respective control circuits has the effect of producing a rectangular pulse sequence Ie at the outputs of the phase comparison flip-flop stages. By this means, a control voltage is conveyed to the oscillator Os, which will cause the oscillator to operate at a frequency which lies in the immediate vicinity of its mid-frequency, and this mid-frequency is the synchronization frequency for the telecommunication system. If the synchronizing pulses emitted from oscillator Os, instead of as shown in FIG. 2, where conveyed directly to flip-flop stages along with the signals received over lines 11, 12 and 13, the pulse-pause ratio ot the output signals from the flip-flop stages could conceivable be of any value, and this would, of course, result in wide frequency swings by oscillator Os. By dividing the frequencies of the synchronizing pulses to a lower value, however, the frequency range over which the oscillator must shift is significantly reduced. That is, the range over which the oscillator must shift is reduced by a value corresponding to the ratio of the width of a synchronizing pulse to the width of the particular number of those synchronizing pulses which cause an output signal to occur after the pulses are produced from the counters Zo, Z1, Z2 and Z3.

It was explained above with the aid of FIG. 3 that under normal conditions, i.e., either before or after synchronization of oscillator Os, a certain control potential is applied to oscillator Os from the output of discriminator P. This can also be O volts. This capability of discriminator P is also used for the event that a corresponding approaching of the discriminator from counters Z1, Z2 and Z3 does not take place. Such a case is assumed in FIG. 4, provided that at first counter Z1 still emits output signals. Thereby flip-flop stage K1 emits signals from its output, the repetition frequency whereof corresponds to that succession frequency with which the signals conveyed to flip-flop stage K1 appear. As can be seen from the pulse trains Ie, If and Ig shown in FIG. 4, flip-flop stage K1 emits, however, at its output g, upon the non-appearance of signals from counter Z1, output signals, the repetition frequency of which are only one half of the frequency of the signals emitted upon the conveying of corresponding signals from the output of counter Z1.

Flip-flop stage K1 is reset only with application of the trailing edges of the individual pulses of pulse train Ie. Resulting from this change of the frequency of flip-flop stage K1, the subsequent control potential emitted from the output of low pass filter TP virtually does not change. In connection with the pulse train If shown in FIG. 4 it should be noted that counter Z1, provided in the circuit arrangement according to FIG. 2, is reset upon the non-appearance of synchronizing pulses on line 11, by the reset signal emitted by its related control circuit St1. Thus, it is able, with the start of its renewed operation, to emit an output signal for the duration of eight synchronizing pulses conveyed to its input.

With the use of an exemplary embodiment there was explained in the foregoing the synchronizing of an oscillator provided in an exchange station of a time multiplex long distance communication network, emitting synchronizing pulses in time slots provided for signal transmission in the exchange station in question, with the aid of the synchronizing pulses emitted by a corresponding oscillator provided in a different exchange station. In practice there are received, in the individual exchange stations, synchronizing pulses emitted from oscillators provided in a plurality of exchange stations, and used appropriately for the synchronizing of the oscillator provided in the exchange station in question. Discriminator P, formed by a sawtooth phase comparator circuit therefore possesses a corresponding number of phase comparator circuits containing, in each case, a bistable flip-flop stage with an addition circuit which carries out an arithmetic mean value formation of the signals obtained in the phase comparisons. A low pass filter is connected to the output of the addition circuit and connected to the control input of the oscillator in the exchange station in question.

I claim:

1. A method for reciprocally synchronizing oscillators provided in each of a plurality of exchange stations of a time multiplex long distance communication network, each said oscillator emitting synchronizing pulses in time slots usable for signal transmission in the exchange station, of which the said oscillator is a part, by employing a discriminator at each exchange station to which are applied synchronizing pulses of the oscillator pertaining thereto and synchronizing pulses of oscillators provided in other exchange stations connected therewith and which applies to the oscillator pertaining thereto a control potential to cause a change in the oscillating frequency of said oscillator comprising:

applying the synchronizing pulses emitted by the oscillator in a given exchange station and the synchronizing pulses transmitted by the oscillators of other exchange stations to frequency dividing means connected to inputs of the discriminator of each said exchange station, selectively starting or terminating application of output signals from said frequency dividing means to the discriminator after receipt of a specified number of synchronizing pulses by the frequency dividing means, emitting output signals from the frequency dividing stages receiving synchronizing pulses from other exchange stations to the discriminator in said given exchange station with termination of the emission of a corresponding output signal from a further frequency dividing means connected to the oscillator provided in said given exchange station.

2. The method according to claim 1, wherein the frequency dividing factor of the frequency dividing means is selected to be equal to the product of the network frequency desired in the entire long distance communication network and the delay time maximally appearing on the individual connection lines over which the synchronizing pulses are transmitted, but at least substantially equal to $\lambda/2\Delta f$, wherein $\lambda$ represents the frequency bandwidth of the oscillator contained in the exchange station in each case, and $\Delta f$ the permissible frequency deviation from said desired network frequency after connection of the individual exchange stations.

3. An arrangement for reciprocally synchronizing finely tunable oscillators provided in each of a plurality of exchange stations of a time division multiplex long distance communication network, each said oscillator having a control input and emitting synchronizing pulses in time slots usable for signal transmission in the exchange station, of which it is a part comprising at each exchange station:

a discriminator having a plurality of inputs and an output to which are applied synchronizing pulses of the oscillator in the exchange station and synchronizing pulses of oscillators provided in other exchange stations connected therewith and which applies to the oscillator in the exchange station a control potential to cause a change in the oscillating frequency of said oscillator in said exchange station, a frequency dividing stage at each exchange station interposed between an output of the oscillator in the exchange station and an input of the discriminator, further frequency dividing stages having a plurality of conditions indicative of the number of received synchronizing pulses, the remaining inputs of the discriminator being connected through said further frequency divider stages to adjacent exchange stations, applying synchronizing pulses thereto, said discriminator output being connected to the control input of the oscillator provided at the associated exchange station to apply control signals thereto to selectively vary the oscillating frequency thereof.

4. The arrangement according to claim 3 further comprising:

a control circuit assigned to each of said further frequency dividing states provided at each exchange station that receive synchronizing pulses from exchange stations adjacent thereto, the control circuit receiving output signals from said frequency dividing stage in the same exchange station that are to be applied to said durther frequency dividing stages of the exchange station, the control circuit emitting signals to said further frequency dividing stages to selectively cause reception of synchronizing signals thereby or reset said further frequency dividing stages to an initial condition.

5. The arrangement according to claim 3 wherein said further frequency dividing stages comprise counters which start or terminate the emission of an output signal to the discriminator in the same exchange station, upon counting a predetermined number of synchronizing pulses applied thereto.

6. The arrangement according to claim 3 wherein said discriminator comprises a sawtooth phase comparator circuit which emits output signals depending upon the relative phase difference between the leading or trailing edges of signals applied thereto.

7. The arrangement according to claim 6 wherein the sawtooth phase comparator circuit comprises sawtooth phase comparator stages that correspond in number to the number of the further frequency dividing stage provided in the same exchange station with regard to the relative phase positions of their leading or trailing edges, said arrangement further comprising:

a common adding circuit connected to the outputs of the sawtooth phase comparator stages provided in each exchange station to derive the arthmetic mean-value of the outputs of said sawtooth phase comparator stages to produce a control potential thereat to regulate the frequency of the oscillator (Os) at the same exchange station.

8. The arrangement according to claim 7 further comprising an amplifier (V1, V2, V3) interposed between each of the sawtooth phase comparator stages and the adding circuit.

9. The arrangement according to claim 8 wherein each sawtooth phase comparator stage comprises a bistable switching stage having at lease one signal input and one synchronizing input and controllable between stable states in response to the leading or trailing edges of signals applied thereto, one of said further frequency dividing stages (Z1, Z2, Z3) that receives synchronizing pulses from other exchange stations being connected to the signal input and said frequency dividing stage in the same exchange station being connected to the synchronizing input.

* * * * *